US006617729B2

(12) United States Patent
Shinohara

(10) Patent No.: US 6,617,729 B2
(45) Date of Patent: Sep. 9, 2003

(54) LIGHT DEFLECTING ELECTRIC MOTOR WITH OSCILLATION PREVENTING MEANS

(75) Inventor: Tsuyoshi Shinohara, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/749,741

(22) Filed: Dec. 28, 2000

(65) Prior Publication Data

US 2001/0005103 A1 Jun. 28, 2001

(30) Foreign Application Priority Data

Dec. 28, 1999 (JP) .......................................... 11-373838

(51) Int. Cl.$^7$ ................................................ H02K 7/08
(52) U.S. Cl. ...................................... 310/90; 310/67 R
(58) Field of Search ................................ 310/90, 67 R, 310/51, 81; 359/198, 200

(56) References Cited

U.S. PATENT DOCUMENTS

| 5,420,713 A | * | 5/1995 | Kunii | .......................... | 359/198 |
| 5,448,121 A | * | 9/1995 | Tada | .......................... | 310/90.5 |
| 5,903,300 A | * | 5/1999 | Suzuki | .......................... | 347/261 |
| 5,925,955 A | * | 7/1999 | Norris | .......................... | 310/90 |

FOREIGN PATENT DOCUMENTS

| JP | 05034625 A | 2/1993 |
| JP | 06110000 A | 4/1994 |
| JP | 6-110000 | 4/1994 |
| JP | 08110491 A | 4/1996 |
| JP | 8-110491 | 4/1996 |
| JP | 8-126265 | 5/1996 |
| JP | 08126265 A | 5/1996 |
| JP | 11271654 A | 10/1999 |
| JP | 11-271654 | 10/1999 |
| JP | 2000/047130 | * 2/2000 | ........... G02B/26/10 |

* cited by examiner

*Primary Examiner*—Thanh Lam
(74) *Attorney, Agent, or Firm*—Pillsbury Winthrop LLP

(57) ABSTRACT

A light deflecting electric motor includes a stator assembly including a base, a fixed shaft fixed to the base and a stator mounted on the base, a rotor assembly including a rotating member rotatably mounted on a plurality of bearings further mounted on the fixed shaft, a polygon mirror mounted on the rotating member and a rotor mounted on the rotating member, the rotor assembly having a center of gravity located between the bearings, and a balancing plane provided in the vicinity of a plane which is generally perpendicular to a center of rotation of the rotor assembly and passes the center of gravity of the rotor assembly.

18 Claims, 6 Drawing Sheets

LIGHT DEFLECTING ELECTRIC MOTOR WITH OSCILLATION PREVENTING MEANS

BACKGROUND OF THE INVENTION

1. Field of the Invention

This invention relates to a light deflecting electric motor for scanning laser beams used in an optical system of laser printers, digital copiers, etc.

2. Description of the Prior Art

FIG. 6 shows one of conventional light deflecting electric motors of the above-described type. The shown motor comprises a base 1 having a recess 1a. An upper cylindrical protrusion 2 extends upward from the bottom of the recess 1a. A lower cylindrical protrusion 3 concentric with the upper protrusion 2 extends downward from the underside of the base 1. Interiors of the protrusions 2 and 3 serve as a through hole 8. Two bearings 10 are provided in the hole 8 and a rotational shaft 9 is rotatably mounted on the bearings 10 in the hole 8. The shaft 9 has a lower end on which a balancer 11 is fixed by a bolt 11a. A bottom cover 12 is mounted on the bottom of the lower protrusion 3 so as to receive the shaft 9 via the balancer 11 and the bolt 11a. A coil spring 13 is interposed between the lower bearing 10 and the balancer 11 to downwardly urge the shaft 9.

A stator 4 of the motor is fixed on an outer circumferential face of the upper protrusion 2. The stator 4 includes a stator core 5 made of laminated steel sheets, a coil 6 wound on the stator core 5, and a stator yoke 7 fixed on the stator core 5. A mirror mount 15 is mounted on an upper portion of the shaft 9. A polygon mirror 16 is fixed to an upper face of the mirror mount 15. A rotor yoke 17 is fixed to an underside of the mirror mount 15. The rotor yoke 17 includes a rotor magnet 18 disposed opposite the stator 4. The rotor yoke 17 and the rotor magnet 18 constitute a rotor 14 of the motor.

The stator 4 is energized so that the rotor 14 and the polygon mirror 16 are rotated. The polygon mirror 16 is caused to oscillate upon high-speed rotation if one or more of rotating members K including the shaft 9, mirror mount 15, polygon mirror 16, rotor yoke 17 and rotor magnet 18 are unbalanced. The oscillation of the polygon mirror 16 causes a laser beam reflected on it to deviate from a predetermined location, resulting in a deterioration in printing quality in the laser beam printer, for example. Balance adjustment is conventionally carried out for the rotating members K to prevent deterioration in the printing quality. More specifically, the balance adjustment is carried out both on the upper face of the polygon mirror 16 and on the upper face of the balancer 11. This manner is referred to as "two-plane balancing." A balancing weight is placed on the upper face of the polygon mirror 16. The upper face of the balancer 11 is cut away or otherwise machined so that the balance is adjusted.

The weight of the polygon mirror accounts for a large percentage of the total weight of the rotating members K. Accordingly, the center of gravity of the rotating members K in the assembled state depends upon a location of the polygon mirror. Since the polygon mirror 16 occupies an upper part of the assembled rotating members K in the above-described motor, the center of gravity of the assembled rotating members K is located between the upper bearing 10 and the polygon mirror 16. When the center of gravity of the rotating members K is thus located above the upper bearing 10, the rotating members K are rotated like a pestle during high-speed rotation while being oscillated. As a result, the oscillation of the rotating members K or more specifically of the polygon mirror 16 is increased.

Further, when the balance adjusting face is located on the upper face of the polygon mirror 16 or on the lower end of the shaft 9, a balance weight is disposed radially or axially away from the center of gravity of the rotating members K or a portion of the member located radially or axially away from the center of gravity of the rotating members K is cut away. Accordingly, even if the rotating members K are balanced as a whole, unbalance in the weight occurs at portions away from the center of gravity of the rotating members K. Thus, when the weight unbalance occurs axially away from the center of gravity of the rotating members K, the polygon mirror 16 is subjected to a large gyroscopic moment thereby to be rotated during the high-speed rotation while being oscillated, whereupon the oscillation is further increased.

SUMMARY OF THE INVENTION

Therefore, an object of the present invention is to provide a light deflecting electric motor in which an amount of oscillation of the polygon mirror during the high-speed rotation can be reduced.

The inventions presented herein provide a light deflecting electric motor comprising a stator assembly including a base, a fixed shaft fixed to the base and a stator mounted on the base, a rotor assembly including a rotating member rotatably mounted on a plurality of bearings further mounted on the fixed shaft, a polygon mirror mounted on the rotating member and an outer circumferential surface and a rotor mounted on the rotating member, the rotor assembly having a center of gravity located between the bearings, the rotor assembly being disposed so that a plane which is generally perpendicular to a center of rotation of the rotor assembly and passes the center of gravity of the rotor assembly passes an inside of the polygon mirror, and the balancing plane provided in the vicinity of a plane.

According to the above-described construction, the balancing plane of the rotor assembly is substantially co-planar with a plane passing the center of gravity of the rotor assembly. Consequently, since the occurrence of gyroscopic moment is prevented in the rotor assembly during the high-speed rotation, the rotor assembly can be prevented from being oscillated. Further, the center of gravity of the rotor assembly is located between the bearings. Accordingly, even when unbalanced, the rotor assembly can further be prevented from being oscillated.

In a preferred form of the invention, each bearing comprises a ball bearing including a number of rolling members each made of ceramic. When each bearing comprises the ball bearing, the oscillation of the rotor assembly resulting from the unbalance in the weight thereof can be restrained or limited by the rigidity of each bearing. Further, when each bearing comprises the ball bearing, the rolling members roll with rotation of the rotor assembly such that the rolling members are worn or the temperatures of the rolling members are increased. The wear or temperature increase of the rolling members causes changes in the accuracy of the bearing. However, ceramic is hard to wear and is less adversely affected by heat. Consequently, changes in the accuracy of the bearing can be prevented and accordingly, the service life of each bearing can be improved.

In another preferred form, the rotor assembly has a balancing groove formed in a portion thereof located below the bearings. Since a location where balancing is carried out is axially spaced away from the center of gravity of the rotor assembly, the balancing weight can be reduced.

In further another preferred form, when the rotor is generally annular and includes a rotor magnet radially opposed to the stator with respect to the rotor and a rotor yoke provided on the rotating member to hold the rotor magnet, and the balancing groove is formed in the rotor yoke or the rotating member, or defined between the rotating member and the rotor yoke.

In further another preferred form, the polygon mirror is generally annular and has a reflecting surface, and the balancing groove is disposed inside relative to the reflecting surface of the polygon mirror.

BRIEF DESCRIPTION OF THE DRAWINGS

Other objects, features and advantages of the present invention will become clear upon reviewing the following description of preferred embodiments, made with reference to the accompanying drawings, in which.

DETAILED DESCRIPTION OF THE PREFERRED EMBODIMENTS

Figure 1:
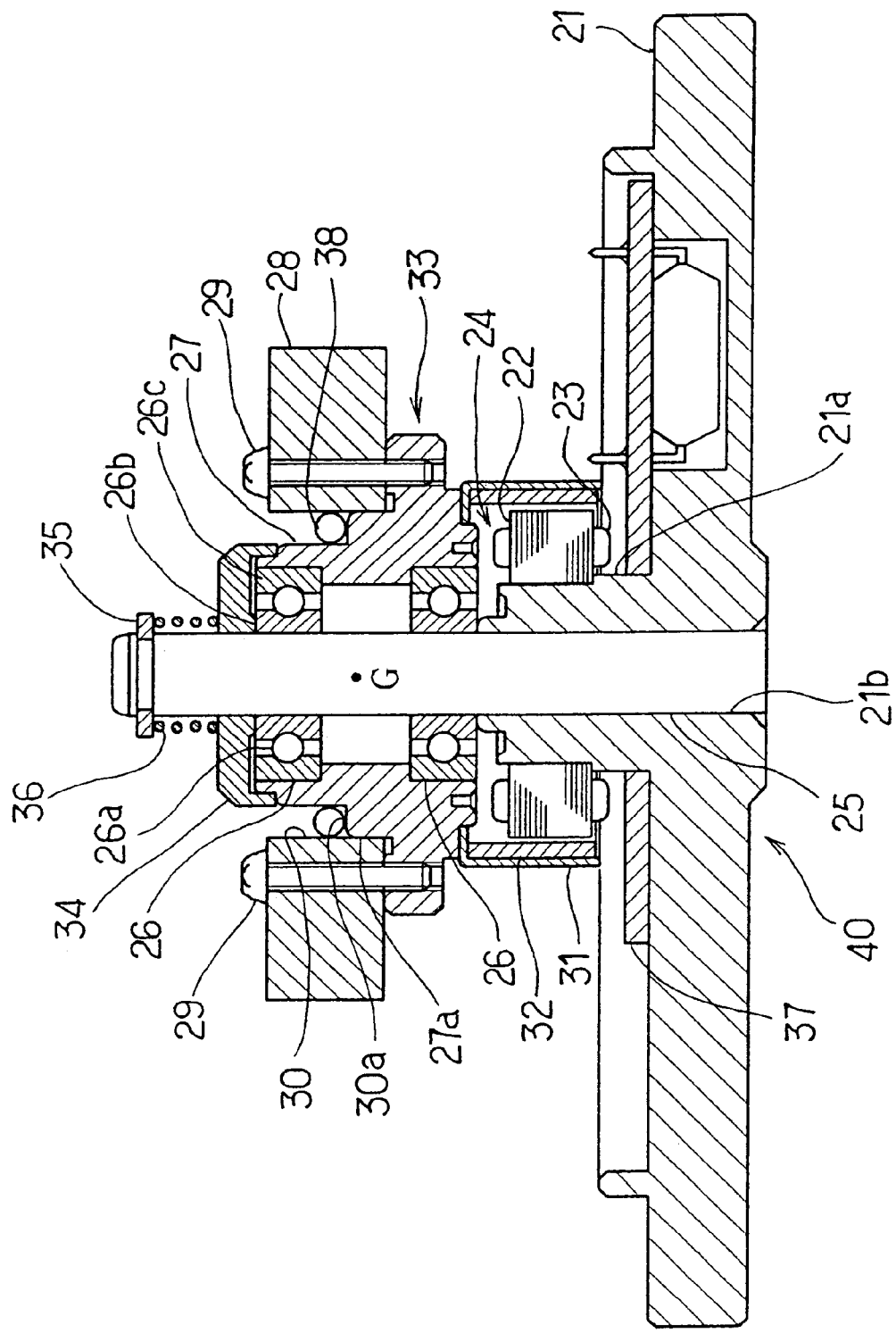
FIG. 1 is a longitudinally sectional front view of the light deflecting motor of a first embodiment in accordance with the present invention.

Several embodiments of the present invention will be described with reference to the drawings. Referring to FIG. 1, the light deflecting motor of a first embodiment is shown. The light deflecting motor comprises a generally disk-shaped base 21 having a hollow protrusion 21a formed on an upper face thereof. An annular stator core 22 is fitted with the protrusion 21a to be fixed thereto. A stator coil 23 is wound on the stator core 22. The stator core 22 and the stator coil 23 constitute a stator 24 of the motor. The protrusion 21a has a vertically extending through hole 21b. A fixed shaft 25 is fitted in the hole 21b. The base 21, stator 24 and fixed shaft 25 constitute a stator assembly 40.

A generally annular housing 27 serving as a rotating member is rotatably mounted on a plurality of, for example, two vertically spaced-apart bearings 26 further mounted on an upper portion of the shaft 25 extending out of the protrusion 21a. In the embodiment, each bearing 26 comprises a number of rolling members 26a each made of ceramic, an inner ring 26b and an outer ring 26c each of which is made of steel. The housing 27 has an upper protrusion 27a formed with, for example, two stepped portions. The upper stepped portion has a smaller diameter than the lower stepped portion. A generally ring-shaped polygon mirror 28 is fixed to an outer circumferential portion of the housing 27 by screws 29. The polygon mirror 28 has an outer circumferential surface serving as a reflecting surface. A lower portion of an inner circumferential surface of the polygon mirror 28 is fitted with the stepped portion of the protrusion 27a with a larger diameter. As a result, a groove 30 is defined between a smaller diameter portion of the protrusion 27a and the polygon mirror 28.

A rotor yoke 31 is bonded or otherwise fixed to a lower portion of the housing 27. The rotor yoke 31 extends downward along an outer circumferential surface of the stator core 22. A ring-shaped rotor magnet 32 is fixed to an inner circumferential surface of the rotor yoke 31 so as to be opposed to the stator core 22 with a predetermined gap therebetween. The housing 27, polygon mirror 28, rotor yoke 31 and rotor magnet 32 constitute a rotor assembly 33.

An oil-mist preventing cap 34 is attached to an upper portion of the upper ball bearing 26. A stop ring 35 is fitted with the upper end of the shaft 25. A coil spring 36 is provided around the upper portion of the shaft 25 between the cap 34 and the stop ring 35. The coil spring 36 urges the inner ring 26b of the upper ball bearing 26 downward and the inner ring 26b of the lower ball bearing 26 upward. A printed circuit board 37 is mounted on the base 21. A drive circuit (not shown) is mounted on the printed circuit board 37 to control energization of the stator coil 22 so that the rotor 33 of the light deflecting motor is rotated.

A balancing weight 38 is secured to the bottom 30a of the groove 30 so that the balance adjustment is carried out for the rotor assembly 37. Accordingly, the bottom 30a of the groove 30 serves as a balancing surface. The weight 38 comprises an adhesive agent made from a resin and hardened when subjected to ultraviolet rays, for example. In this case, the bottom 30a of the groove 30 is substantially coplanar with a plane which is at a right angle to a central axis of the fixed shaft 25 and further which involves the center of gravity of the rotor assembly 33 as shown by reference symbol "G" in FIG. 1. The center of gravity G of the rotor assembly 33 is located between the two ball bearings 26.

The operation of the light deflecting motor will now be described. The polygon mirror 28 is rotated when the stator coil 23 is energized so that the rotor assembly 33 is driven. Since the center of gravity G of the rotor assembly 33 is located between the upper and lower ball bearings 26, the rotor assembly can be prevented from being rotated like a pestle with oscillation during high-speed rotation. Moreover, the balancing surface, namely, the bottom 30a of the groove 30 is coplanar with the plane which is at a right angle to the central axis of the fixed shaft 25 and further which involves the center of gravity G of the rotor assembly 33. Consequently, since no gyroscopic moment occurs in the rotor assembly 33 even when it is rotated at high speeds, an amount of oscillation of the overall rotor assembly 33 and more specifically, of the polygon mirror 28 can be reduced.

Further, even if the motor has a single balancing surface, the balance adjustment can sufficiently be carried out for the rotor assembly 33. Consequently, the balance adjustment can be performed more easily in the aforesaid motor as compared with the prior-art construction employing the two balancing surfaces.

Figure 2:
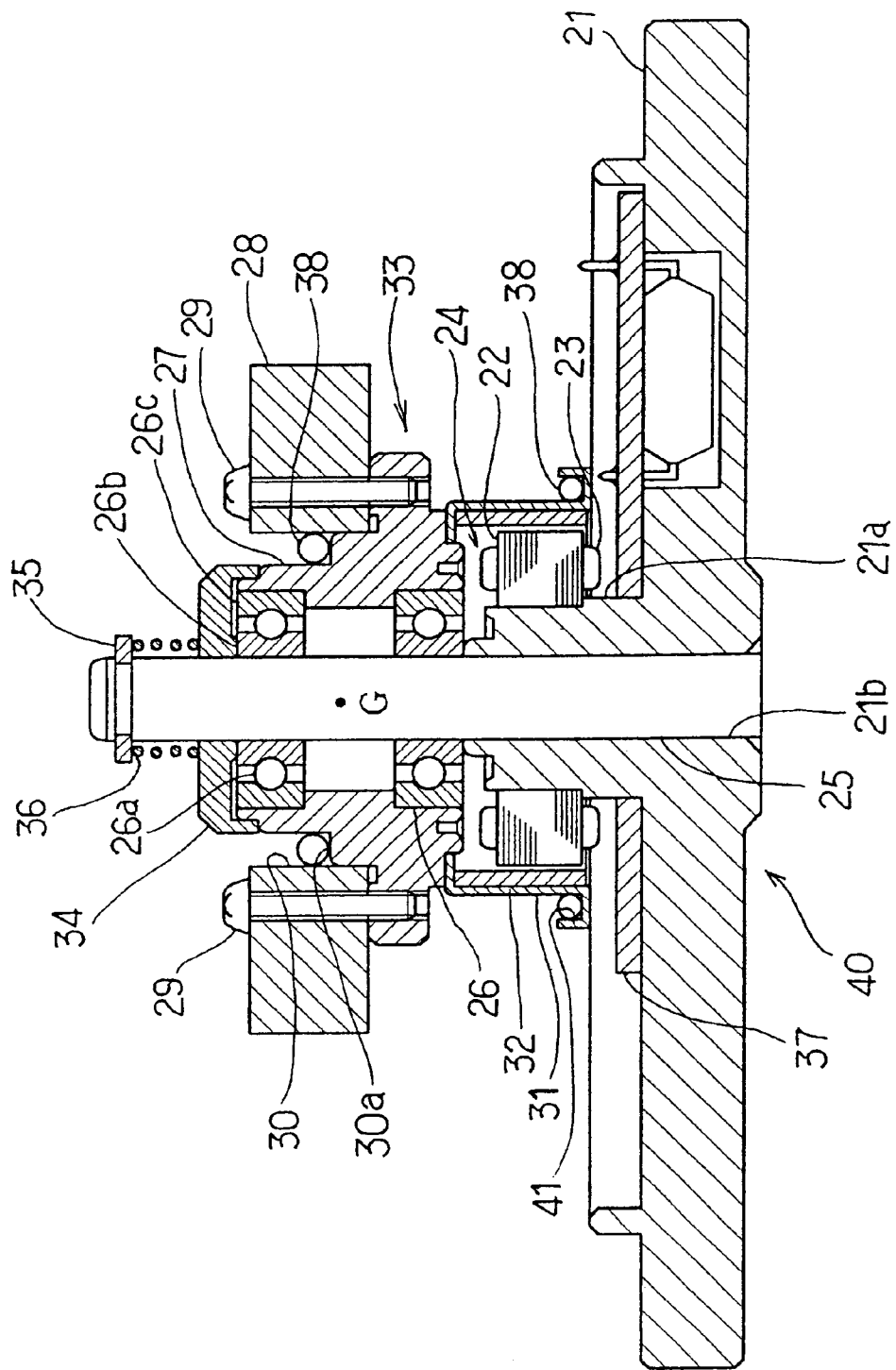
FIG. 2 is a view similar to FIG. 1, showing the light deflecting motor of a second embodiment in accordance with the invention.

FIG. 2 illustrates a second embodiment of the invention. Only the difference between the first and second embodiments will be described. Identical or similar parts in the second embodiment are labeled by the same reference numerals as in the first embodiment. The light deflecting motor of the second embodiment has a balancing groove 41 formed in a lower end of an outer circumferential face of the rotor yoke 31. Accordingly, a balancing weight 42 comprising the ultraviolet hardening resin is secured to the bottom of the groove 41 as well as to the bottom of the groove 30 in the second embodiment. In other words, the balance adjustment is carried out on two faces of the grooves 30 and 41 respectively in the embodiment. As a result, since the balance adjustment is carried out radially and axially with respect to the rotor assembly 33, the overall rotor assembly can effectively be balanced and the radial and axial oscillations of the rotor assembly during high-speed rotation can be reduced.

Further, the groove 41 is disposed in the lower end of the rotor yoke 31 which is axially farthest from the center of gravity G in the rotor assembly 33. Consequently, the balance adjustment can accurately be carried out with a smaller mount of balancing weight 38 in the groove 41. Moreover, since the balancing weight 38 is accommodated in the groove 41, it can be prevented from centrifugally flying out of the groove. Further, if the balancing weight 38 flies out of the groove or is broken to be scattered, scattered pieces of the weight 38 can be prevented from adhering to the reflecting surface of the polygon mirror 28 since the groove 41 is located inside as compared with the reflecting surface. Additionally, since the groove 41 is formed integrally with the rotor yoke 31, an increase in the number of parts can be prevented.

Figure 3:
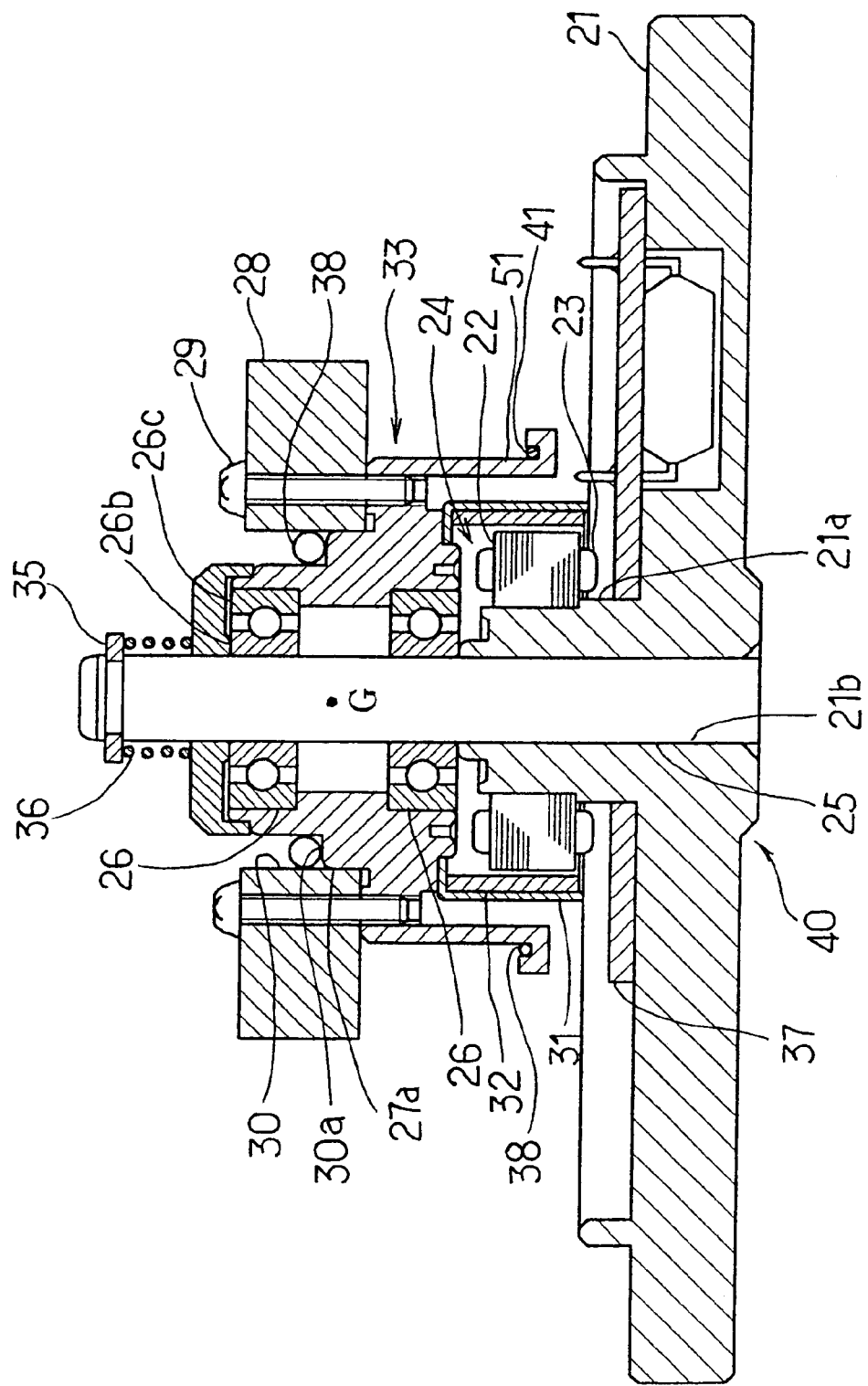
FIG. 3 is a view similar to FIG. 1, showing the light deflecting motor of a third embodiment in accordance with the invention.

FIG. 3 illustrates a third embodiment of the invention. Only the differences between the second and third embodiments will be described. In the third embodiment, a flange 51 is formed integrally on a lower circumferential edge of the housing 27. The flange 51 is radially opposed to the outer circumferential face of the rotor yoke 31. The groove 41 is formed in the outer circumferential portion of the lower end of the flange 51 in the third embodiment although it is formed in the lower end of the rotor yoke 31 in the second embodiment. In this construction, too, the balancing weights 38 are secured in both grooves 31 and 41 respectively so that the balance adjustment is carried out. Consequently, the same effect can be achieved in the third embodiment as in the second embodiment.

Figure 4:
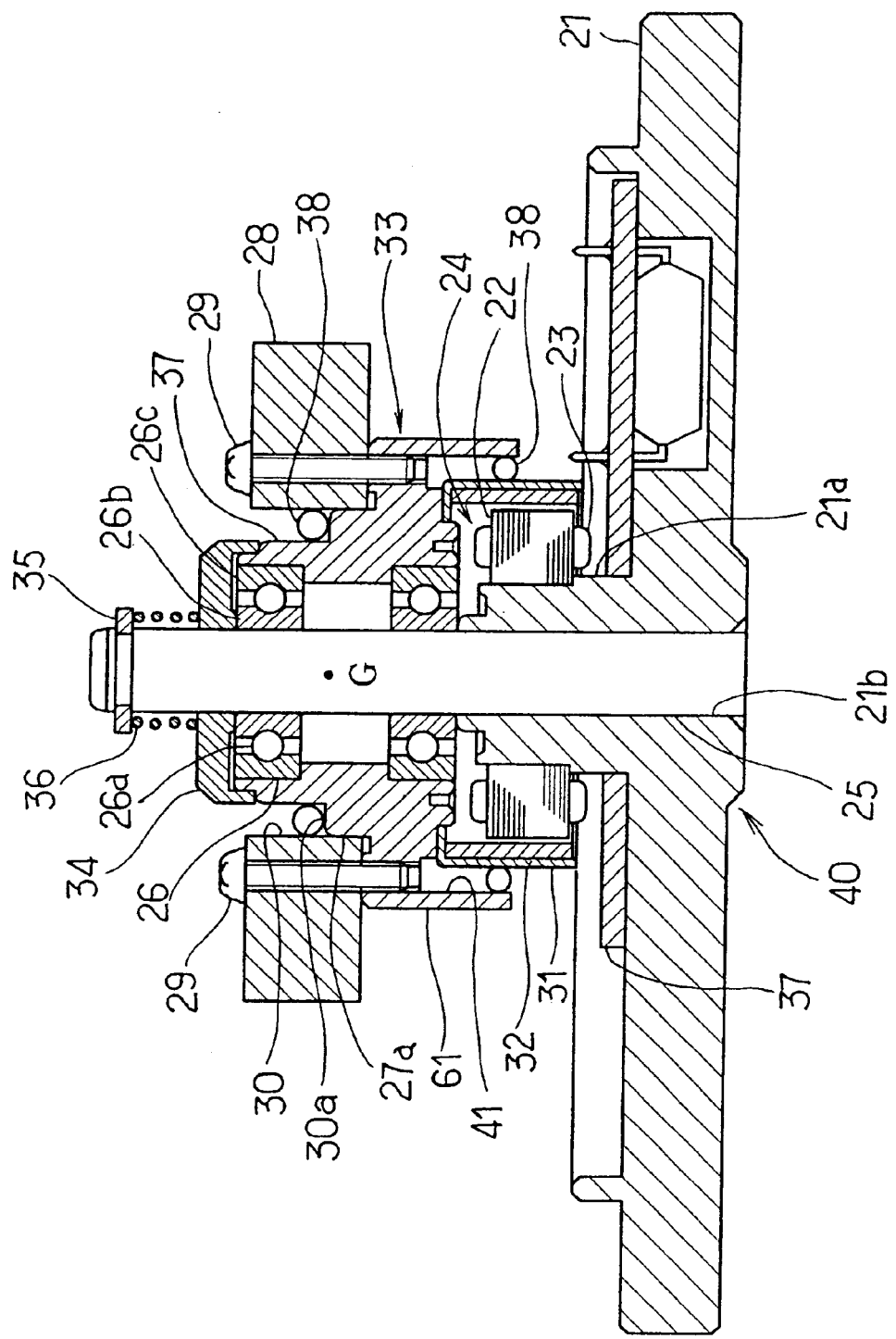
FIG. 4 is a view similar to FIG. 1, showing the light deflecting motor of a fourth embodiment in accordance with the invention.

FIG. 4 illustrates a fourth embodiment of the invention. Only the differences between the second and fourth embodiments will be described. In the fourth embodiment, a flange 61 is formed integrally on a lower circumferential edge of the housing 27. The flange 61 is radially opposed to the outer circumferential face of the rotor yoke 31. In the fourth embodiment, the groove 41 is defined by the rotor yoke 31 and the flange 61. Accordingly, in the fourth embodiment, too, the balancing weights 38 are secured in both grooves 31 and 41 respectively so that the balance adjustment is carried out. Consequently, the same effect can be achieved in the fourth embodiment as in the second embodiment. The balancing weight 38 secured in the groove 41 is made of, for example, a thermosetting resin since ultraviolet rays cannot be irradiated onto the groove.

Figure 5:
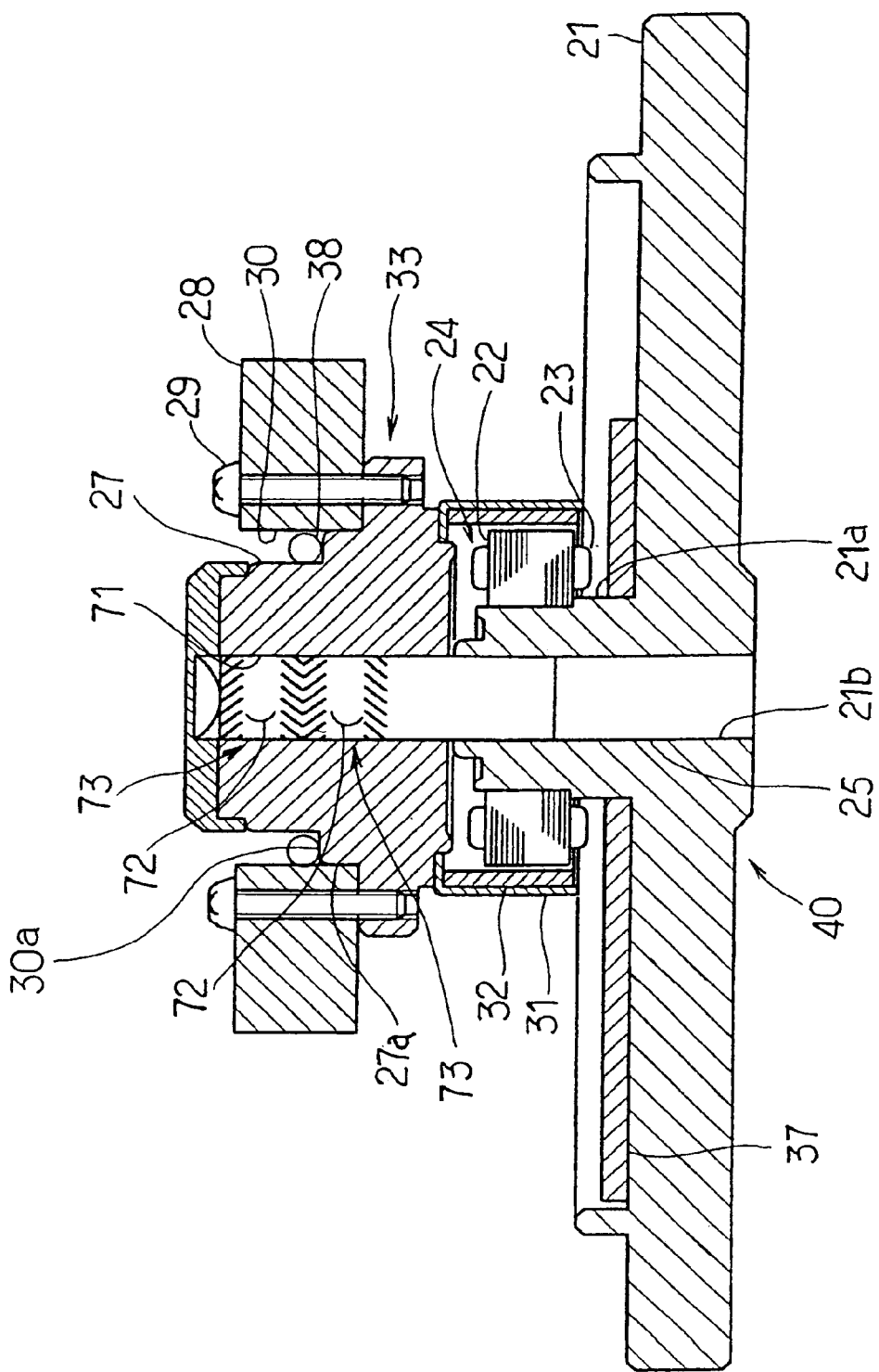
FIG. 5 is a view similar to FIG. 1, showing the light deflecting motor of a fifth embodiment in accordance with the invention.
Figure 6:
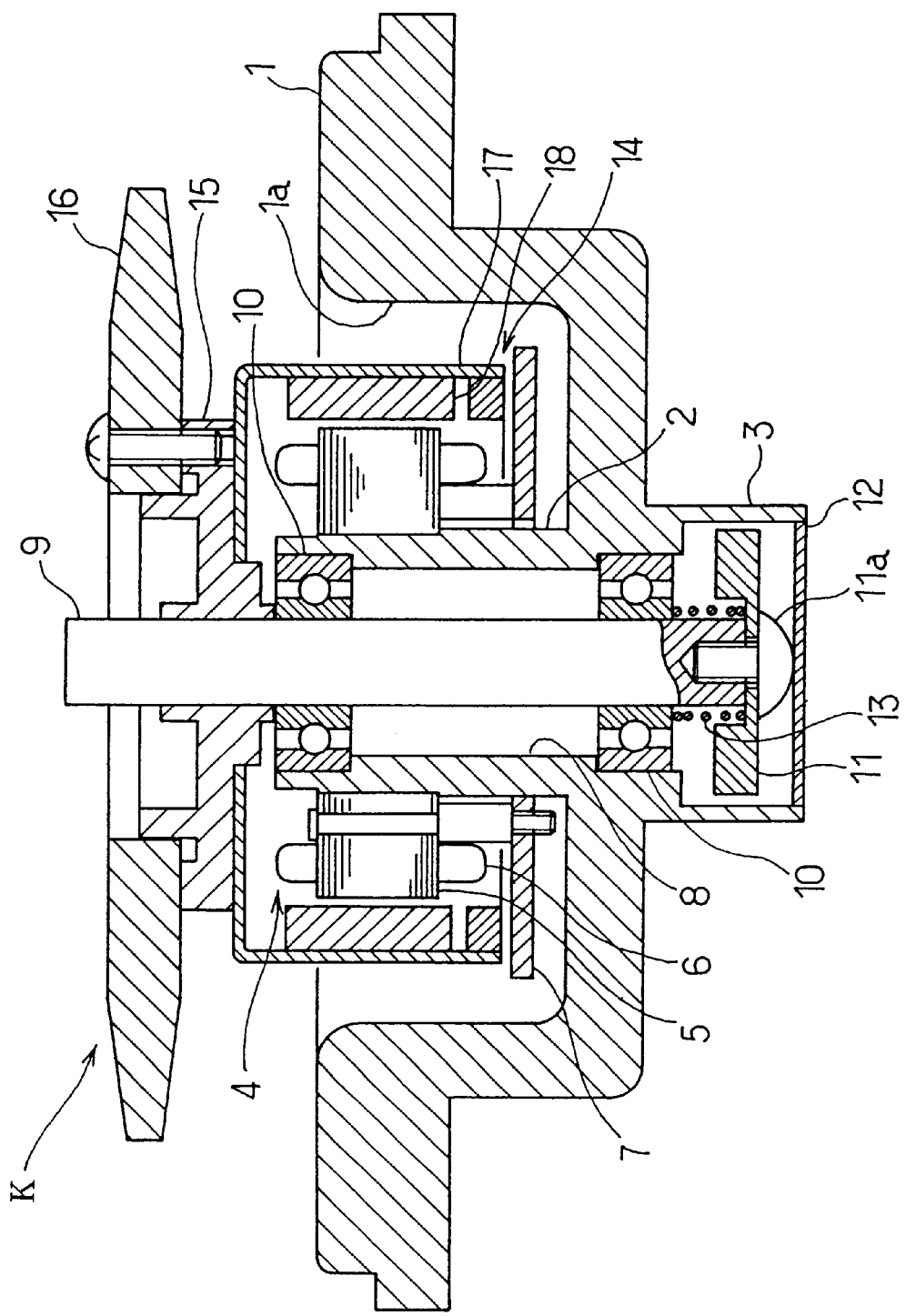
FIG. 6 is a view similar to FIG. 1, showing a prior-art light deflecting motor.

FIG. 5 illustrates a fifth embodiment of the invention. Only the differences between the first and fifth embodiments will be described. Dynamic pressure air bearings are used in the fifth embodiment. More specifically, the housing 27 has a centrally formed axial through hole 71 in which the fixed shaft 25 is inserted. A gap of several μm is defined between the inner circumferential face of the hole 71 and the outer circumferential face of the shaft 25. The shaft 25 has two pairs of herringbone grooves 72 formed in the outer circumferential face of a portion of the shaft 25 located in the hole 71. Accordingly, two dynamic pressure air bearings 73 are constituted by the portion of the outer circumferential face formed with the grooves 72 and the inner circumferential face of the hole 71.

The center of gravity (not shown) of the rotor assembly 33 is located between the dynamic pressure air bearings 73 in the fifth embodiment. The other construction of the motor of the fifth embodiment is substantially the same as that of the first embodiment. Accordingly, the same effect can be achieved from the fifth embodiment as from the first embodiment.

In a modified form, three or more bearings may be provided, instead of two. Further, each ball bearing may be made of ceramic in its entirety. Although the manufacturing cost is increased in this case, the wear and abrasion resistance and heat resistance of the ball bearings can be improved. Consequently, the service life of each ball bearing can be improved and errors in the accuracy can be prevented.

The invention is applied to the light deflecting motor of the radial gap type in which the stator and rotor magnet are disposed to be radially opposed to each other in the foregoing embodiments. However, the invention may be applied to a light deflecting motor of the axial gap type in which a stator and a rotor magnet are disposed to be axially opposed to each other. Further, the invention may be applied to motors of the inner rotor type in which a stator is disposed outside the rotor as well as motors of the outer rotor type in which a stator is disposed inside the rotor.

The balancing groove is located in the lower end of the housing, the lower end of the rotor yoke, and between the housing and the rotor yoke in the foregoing embodiments. The location of the balancing groove should not limited to them. The balancing groove may assume any location below the bearings on the rotor assembly. For example, the groove may be provided on the rotor magnet. Additionally, the groove is provided between the housing and the polygon mirror and the bottom of the groove serves as the balancing plane in the foregoing embodiments. However, either housing or polygon mirror may be formed with the groove having the bottom serving as the balancing plane, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A light deflecting electric motor comprising:
   a stator assembly including a base, a fixed shaft fixed to the base and a stator mounted on the base;
   a rotor assembly including a rotating member rotatably mounted on a plurality of bearings further mounted on the fixed shaft, a polygon mirror mounted on the rotating member and having an outer circumferential surface and a rotor mounted on the rotating member, the rotor assembly having a center of gravity located between the bearings, the rotor assembly being disposed so that a plane which is generally perpendicular to a center of rotation of the rotor assembly and passes the center of gravity of the rotor assembly passes an inside of the polygon mirror; and
   a balancing plane provided in the vicinity of said plane.

2. The motor according to claim 1, wherein each bearing comprises a ball bearing including a number of rolling members each made of ceramic.

3. The motor according to claim 2, wherein the rotor assembly has a balancing groove formed in a portion thereof located below the bearings.

4. The motor according to claim 3, wherein the rotor is generally annular and includes a rotor magnet radially opposed to the stator with respect to the rotor and a rotor yoke provided on the rotating member to hold the rotor magnet, and the balancing groove is formed in the rotor yoke.

5. The motor according to claim 4, wherein the polygon mirror is generally annular and has a reflecting surface, and the balancing groove is disposed inside relative to the reflecting surface of the polygon mirror.

6. The motor according to claim 3, wherein the rotor is generally annular and includes a rotor magnet radially opposed to the stator with respect to the rotor and a rotor yoke provided on the rotating member to hold the rotor magnet, and the balancing groove is formed in the rotating member.

7. The motor according to claim 6, wherein the polygon mirror is generally annular and has a reflecting surface, and the balancing groove is disposed inside relative to the reflecting surface of the polygon mirror.

8. The motor according to claim 3, wherein the rotor is generally annular and includes a rotor magnet radially opposed to the stator with respect to the rotor and a rotor yoke provided on the rotating member to hold the rotor magnet, and the balancing groove is defined between the rotating member and the rotor yoke.

9. The motor according to claim 8, wherein the polygon mirror is generally annular and has a reflecting surface, and the balancing groove is disposed inside relative to the reflecting surface of the polygon mirror.

10. The motor according to claim 3, wherein the polygon mirror is generally annular and has a reflecting surface, and the balancing groove is disposed inside relative to the reflecting surface of the polygon mirror.

11. The motor according to claim 1, wherein the rotor assembly has a balancing groove formed in a portion thereof located below the bearings.

12. The motor according to claim 11, wherein the rotor is generally annular and includes a rotor magnet radially opposed to the stator with respect to the rotor and a rotor yoke provided on the rotating member to hold the rotor magnet, and the balancing groove is formed in the rotor yoke.

13. The motor according to claim 12, wherein the polygon mirror is generally annular and has a reflecting surface, and the balancing groove is disposed inside relative to the reflecting surface of the polygon mirror.

14. The motor according to claim 11, wherein the rotor is generally annular and includes a rotor magnet radially opposed to the stator with respect to the rotor and a rotor yoke provided on the rotating member to hold the rotor magnet, and the balancing groove is formed in the rotating member.

15. The motor according to claim 14, wherein the polygon mirror is generally annular and has a reflecting surface, and the balancing groove is disposed inside relative to the reflecting surface of the polygon mirror.

16. The motor according to claim 11, wherein the rotor is generally annular and includes a rotor magnet radially opposed to the stator with respect to the rotor and a rotor yoke provided on the rotating member to hold the rotor magnet, and the balancing groove is defined between the rotating member and the rotor yoke.

17. The motor according to claim 16, wherein the polygon mirror is generally annular and has a reflecting surface, and the balancing groove is disposed inside relative to the reflecting surface of the polygon mirror.

18. The motor according to claim 11, wherein the polygon mirror is generally annular and has a reflecting surface, and the balancing groove is disposed inside relative to the reflecting surface of the polygon mirror.

\* \* \* \* \*